United States Patent Office 3,507,891
Patented Apr. 21, 1970

3,507,891
CARBONYLATION
George W. Hearne, Lafayette, Kenneth E. Furman, Richmond, Rupert C. Morris, Berkeley, and John L. Van Winkle, San Lorenzo, Calif., assignors to Shell Oil Company, New York, N.Y., a corporation of Delaware
No Drawing. Filed Sept. 6, 1966, Ser. No. 577,534
Int. Cl. C11c 3/00
U.S. Cl. 260—410.9                                  8 Claims

ABSTRACT OF THE DISCLOSURE

An improved process for the alkoxycarbonylation of nonacetylenic olefinically unsaturated aliphatic hydrocarbons with carbon monoxide and lower aliphatic alcohol carried out in the presence of, as catalyst, a complex of cobalt, carbon monoxide, and substituted pyridine without ortho substitution but with one or more hydrocarbon moiety substituents of at least one carbon on any ring C-atom produces lower alkyl esters of carboxylic acids high in normal content at high conversions and at relatively low temperatures and pressures.

---

This invention relates to an improved method of preparing lower alkyl esters of aliphatic carboxylic acids by the carbonylation of nonacetylenic olefinically unsaturated aliphatic hydrocarbon using a modified cobalt carbonylation catalyst in the presence of aliphatic alcohol, particularly lower aliphatic alcohol.

PRIOR ART

It is known that esters and other functional derivatives of carboxylic acids such as amides and anhydrides may be prepared by reacting an olefin and carbon monoxide with an appropriate compound containing a replaceable hydrogen atom, e.g., water, alcohol, amines and acids, in the presence of a suitable carbonylation catalyst.

W. Reppe, U.S. Patent 2,689,261, describes the production of carboxylic acid esters by carbonylation, employing as catalysts complex metal-ammonium or -amine salts of metal carbonyl hydrides, for example to cobalto hexammine salts of cobalt carbonyl hydride or a pyridine-iron complex salt of cobalt carbonyl hydride. A. Matsuda and H. Uchida, Bull. Chem. Soc. Japan 38, 710 (1965), described the production of methyl butyrate by reacting propylene with carbon monoxide and methanol in the presence of dicobalt octacarbonyl and pyridine or other organic bases, and a small amount of hydrogen.

Heretofore, carbonylation processing has required high temperatures and pressures to carry out the reaction, thereby necessitating rather expensive and elaborate equipment. In general, temperatures in the range of 160–300° C. and pressures in the range of 1500–5000 p.s.i.g. are required.

Carbonylation catalysts usually employed have proven successful to a certain extent in the preparation of esters from lower α-olefins, carbon monoxide and a lower alcohol. However, when the olefin used is a higher olefin or an internal rather than an α-olefin, conversion of reactants has been relatively low.

Certain difficulties have been found in the production of esters by reacting α-olefins with carbon monoxide and a lower alcohol in the presence of a cobalt carbonyl-pyridine catalyst. In such alkoxycarbonylation, the reactor effluent contains substantial amounts of low-boiling materials, mainly excess lower alcohol, which must be removed before the desired ester can be overheated. After the removal of the low-boiling materials, the ester product may be recovered, for example by flashing. Cobalt carbonyl-pyridine catalyst is much less stable when not under carbon monoxide pressure and has been found to decompose, depositing cobalt metal under the conditions of ester-product flashing.

OBJECTS OF INVENTION

It is an object of the present invention to provide an improved process for the alkoxycarbonylation of nonacetylenic olefinically unsaturated aliphatic hydrocarbons to esters whereby high conversions and high ester selectivities are obtained at relatively low temperatures and pressures.

It is also an object of the present invention to provide an improved process for the preparation of esters from higher nonacetylenic olefinically unsaturated aliphatic hydrocarbons and from nonacetylenic internal olefinically unsaturated aliphatic hydrocarbons by catalytic alkoxycarbonylation of these unsaturated hydrocarbons with carbon monoxide and alcohol.

It is a further object of this invention to provide alkoxycarbonylation catalysts of improved heat stability.

THE INVENTION

It has now been discovered that nonacetylenic olefinically unsaturated aliphatic hydrocarbons can be efficiently alkoxycarbonylated with carbon monoxide and lower aliphatic alcohol to form lower alkyl esters of carboxylic acids high in normal content at high conversions and under relatively mild reaction conditions when the reaction is carried out in the presence of, as catalyst, a complex of cobalt, carbon monoxide, and certain substituted pyridines without ortho substitution but with one or more hydrocarbon moiety substituents of at least one carbon on any ring C-atom. The ester then formed can be hydrolyzed to form carboxylic acid corresponding to the acyl portion of the ester.

REACTANTS

The substituted pyridines which are useful for the complexes of this invention include a wide variety of pyridines not substituted in the ortho position, i.e., not substituted on a ring C-atom adjacent to the ring N-atom. Representative substituted pyridines are 3-methylpyridine, 4-methylpyridine, 4-butylpyridine, 3,4-dimethylpyridine, 3,5-dimethylpyridine, 4-ethylpyridine, 4-ethyl-3-methylpyridine, 3-ethyl-4-methylpyridine, 4-ethyl-3,5-dimethylpyridine, 4-(diphenylmethyl)pyridine, 4,4'-trimethylenedipyridine, isoquinoline, and the like. Isoquinoline can be considered a pyridine substituted in both the 3- and 4-positions each with a 2-carbon moiety (joined to form a benzo moiety). Similarly, 4,4'-trimethylenedipyridine can be considered as two pyridines each substituted in the 4-position with a 1½-carbon moiety. In the non-ortho positions, hydrocarbon substitution is preferred to consist of a total of from one to 30 carbons. A particularly preferred class of hydrocarbon substituents are the lower alkyls of 1 to 4 carbons. In certain processing where less volatile substituted pyridine may be desired, another preferred class of substituents are hydrocarbyls of 10 to 20 carbons.

The nonacetylenic olefinically unsaturated aliphatic hydrocarbon to be alkoxycarbonylated is not particularly critical. A preferred group of nonacetylenic olefinically unsaturated aliphatic hydrocarbons includes aliphatic olefins, essentially monoolefins. A convenient group of starting materials is the aliphatic olefins in the range of $C_8$ to $C_{18}$ carbon atoms. One of the distinct advantages of the present invention is that it is applicable to internally located olefinic unsaturation as well as terminally located unsaturation. Internal olefins are isomerized during the process of the present invention to give conversion comparable to those obtained starting from α-olefins.

The process of this invention is especially applicable in the alkoxycarbonylation of higher olefins since the esters so produced are substantially normal and can be hydrolyzed to the corresponding straight chain carboxylic acids useful in the formulation of soaps. For these reasons, olefins having from 10 to 16 carbon atoms are preferred as starting materials. Cracked wax and cracked gas oil olefins, ethylene growth (Ziegler) olefins, and dehydrochlorinated mixed chlorinated n-paraffin olefins are all suitable.

Branched olefinic materials may also be used. Both internal and terminal ($\alpha$) branched olefins react in the same manner as straight-chain olefins, producing esters having no greater degree of branching than the olefinic material reacted.

The alcohol used in the alkoxycarbonylation reaction is preferably a lower aliphatic alcohol and especially methanol, as the methyl esters thus formed are useful as solvents. Ethanol, propanol, isopropanol, and n-butanol are also useful. Ethylene glycol, propylene glycol, trimethylene glycol, and glycerol, as well as other lower alkane polyols are also useful. Lower alcohols are preferred also from the standpoint of subsequent hydrolysis to produce carboxylic acids, particularly those corresponding to higher olefins. The lower alcohols are more easily removed in the hydrolytic step. However, if desired, higher alcohols containing up to 22 carbon atoms can be used. In some instances, it is advantageous to use an alcohol having one more carbon atom than the olefin being alkoxycarbonylated. The ester thus formed contains the same number of carbon atoms in both the acid and alcohol moieties. For example, alkoxycarbonylation of 1-eicosene using 1-heneicosanol produces heneicosyl heneicosanoate.

REACTION CONDITIONS

Prior art corbonylation reactions usually require temperatures in excess of 160° C., i.e. 160–300° C., and pressures in excess of 1500 p.s.i.g. and usually in the range of 3000 to 5000 p.s.i.g. The process of the present invention carried out in the presence of, as catalyst, a complex of cobalt, carbon monoxide, and the hereinabove described substituted pyridine is operative at temperatures of between about 100° and about 200° C., preferably between about 120° and about 170° C., and even more preferably between about 140° and about 160° C., thereby resulting in a substantial heat reduction over prior art processes. Equally as significant is the reduction in pressure range from prior art processes. The present process requires pressures in the range of between about 200 to about 200 p.s.i.g. and is preferably operated at a pressure between about 600 and about 1400 p.s.i.g.

The pressure within the reaction zone is created primarily by carbon monoxide. However, if methanol is the lower alcohol used in the alkoxycarbonylation reaction, considerable pressure will be exerted by methanol vapors. As higher alcohols than methanol are used, less pressure due to the alcohol is present. The amount of carbon monoxide added to the process is dependent upon the pressures to be attained and is always in excess of the stoichiometric amount required to react with the olefin and for formation of the catalyst complex. Substantially pure carbon monoxide is used; however, if desired, a minor amount of hydrogen, not to exceed 10% of the added gas, may be employed as it further reduces alkoxycarbonylation reaction temperature and time.

The molar ratio of alcohol to unsaturated reactant in the alkoxycarbonylation reaction is usually between 0.6:1 and 10:1, with ratios between 0.8:1 and 6:1 being preferred.

The substituted pyridine-to-cobalt molar ratio is in substantial excess of unity, generally at least 2:1 and is preferably at least 4:1, and in some instances, between 6:1 and 18:1. The cobalt concentration based on the total reaction charge is between 0.1 and 2% by weight and is preferably between 0.25 and 1.25% by weight. Concentrations of about 0.5 to 1.0% by weight, calculated as cobalt, are especially preferred.

The catalyst complex may be formed by introducing a preformed cobalt carbonyl such as dicobalt octacarbonyl into the reaction zone or by adding cobalt compounds, especially salts, e.g., cobalt alkanoates of 2 to 18 carbon atoms, convertible to cobalt carbonyl under carbonylation conditions, such as cobalt octanoate, to the reaction mixture.

If desired, the reaction may also be carried out in the presence of solvents, especially liquid aliphatic and aromatic hydrocarbons, e.g., decane, hexadecane, toluene, xylenes, and tetralin.

The contact time in the alkoxycarbonylation zone may vary, depending upon reaction conditions, but is usually between 5 and 20 hours. The reaction may be carried out on a batch or continuous basis depending upon the size of the operation.

At the conclusion of the reaction, a stream of air may be passed through the product at room temperature or elevated temperature for 5–60 minutes to decompose the catalyst complex. This converts the cobalt into an oxidized state which is stable and will remain in solution during subsequent distillation of the reaction product. The soluble cobalt can be recycled to the alkoxycarbonylation step for the regeneration of catalyst. However, it is by far more prefereable not to decompose the catalyst complex but to recover it for recirculation and further usage. When the catalyst is a complex of cobalt, carbon monoxide, and pyridine, direct distillation of product containing the complex results in the formation of 10% or more metallic cobalt which cannot be readily reconverted to catalyst. When the catalyst is a complex of cobalt, carbon monoxide, and the substituted pyridines of the invention, for example 3,5-dimethylpyridine, the complex unexpectedly possesses high thermal stability enabling the removal of unreacted alcohol and unsaturated starting materialy by distillation followed by ester flashing and recycling of the stable active catalyst complex as bottoms therefrom.

When a carboxylic acid or its alkali metal salt (e.g., soap) is the desired product, the crude ester product may be saponified and the product resulting therefrom further purified. For example, treatment with 20% aqueous potassium hydroxide while stirring and heating will hydrolyze the ester with concomitant distillation of the resulting lower alcohol, e.g., methanol. When evolution of alcohol is complete, the solution can be cooled and diluted with water, e.g., to give a 25% solution of potassium carboxylate. Although carbonyl impurities, such as acetals and aldehydes, are formed advantageously in lesser amounts when the catalyst is a complex of cobalt, carbon monoxide, and the substituted pyridines of the invention than when the catalyst is a complex of cobalt, carbon monoxide and pyridine, it is desirable that these impurities be removed. Their removal can be effected by extracting with solvents, e.g., methylene chloride, ether, benzene, and the like, or high-pressure, high-temperature steam distillation. Alternatively, the potassium carboxylate solution may be acidified with, for example, concentrated hydrochloric acid, and the carboxylic acid recovered by extraction or distillation. Carbonyl impurities can be removed from the carboxylic acids by treatment with aqueous sodium bisulfite.

The above saponification step is exemplary only. Any convenient hydrolysis step known in the art may be employed. For example, hydrolysis using inorganic acids may also be used. Hydrolysis methods useful in general are those mentioned by W. J. Hickinbottom, "Reactions of Organic Compounds", 355–358, Longmans, Green and Co., London, 1957.

Alternatively, the ester product can be hydrogenated, employing any conventional hydrogenation step known in the art, to form normal alcohol corresponding to the acyl portion of the ester as well as alcohol corresponding to the alkyl moiety of the ester.

EXAMPLE I

A reaction zone previously purged with nitrogen was charged with a methanol/1-dodecene mixture in a molar ratio of 4:1. Pyridine or nonortho-substituted pyridine ligand (see Table 1 below) and cobalt octanoate in a molar ratio of 6:1 were added to give a cobalt concentration of 1.0% by weight of the total reaction charge. The reaction zone was charged with carbon monoxide and maintained at 160° C. and a pressure of 1000 p.s.i.g. CO for an ascertained period of time, after which the pressure was released and the product cooled and analyzed by gas-liquid chromatography (GLC). The results are summarized in Table 1.

TABLE 1

| Ligand: | Olefin conversion, percent by weight | Time required for 50% olefin conversion, hours | Selectivity, percent by weight | | | Normal ester [1], percent by weight |
|---|---|---|---|---|---|---|
| | | | Ester | Acetal | Aldehyde | |
| Pyridine | 99.1 | 2.2 | 93.7 | 2.7 | 2.6 | 75.6 |
| 3-methylpyridine | 98.9 | 2.2 | 95.9 | 1.8 | 2.5 | 78.0 |
| 4-methylpyridine | 99.2 | 2.7 | 98.1 | 1.0 | 0.5 | 78.3 |
| 4-ethylpyridine | 98.5 | 1.7 | 97.6 | 0.9 | 1.4 | 79.5 |
| 3,4 dimethylpyridine | 98.6 | 1.7 | 99.7 | 0.3 | 0.0 | 81.5 |
| 3,5-dimethylpyridine | 98.5 | 1.7 | 97.9 | 0.9 | 1.3 | 80.3 |
| 4-ethyl-3-methylpyridine | 96.7 | 2.0 | 98.4 | 0.8 | 0.8 | 81.0 |
| 3-ethyl-4-methylpyridine | 95.2 | 2.1 | 98.2 | 1.2 | 0.7 | 81.2 |
| 4-(diphenylmethyl)pyridine | 98.6 | 2.2 | 95.4 | 2.6 | 2.1 | 77.2 |
| 4,4'-trimethylenedipyridine | 94.5 | 2.8 | 97.8 | 1.0 | 1.3 | 79.0 |
| Isoquinoline | 98.2 | 3.4 | 96.3 | 1.7 | 1.8 | 77.0 |
| 4-ethyl-3,5-dimethylpyridine | 87.9 | 3.4 | 99.6 | 0.4 | 0.2 | 82.1 |

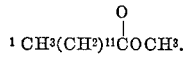

EXAMPLE II

For purposes of comparison a number of ortho-substituted pyridines were utilized as ligands following the directions of Example I. The data, summarized in Table 2, indicate that, when these ligands are utilized, the results are inferior to those obtained either with the comparative ligand pyridine or with the nonortho-substituted pyridines of the invention.

TABLE 2

| Ligand | Olefin conversion, percent by weight | Time required for 50% olefin conversion, hours | Selectivity, percent by weight | | | Normal ester [1] percent by weight |
|---|---|---|---|---|---|---|
| | | | Ester | Acetal | Aldehyde | |
| Pyridine | 99.1 | 2.2 | 93.7 | 2.7 | 2.6 | 75.6 |
| 2-methylpyridine | 86.3 | 6.5 | 67.3 | 22.4 | 8.6 | 44.4 |
| Quinoline | 74.3 | 6.4 | 67.8 | 22.7 | 7.5 | 48.0 |
| 2,6-dimethylpyridine | 60.8 | 7.9 | 71.2 | 20.4 | 6.7 | 45.0 |
| 2,2'-dipyridyl | 14.1 | 84.0 | 0.0 | | | 0.0 |

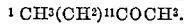

EXAMPLE III

Six runs under the same conditions as used in Example I were carried out with 4-methylpyridine as ligand, the exception being that different ligand-to-cobalt ratios were utilized. The results are summarized in Table 3.

TABLE 3

| Ligand/cobalt mole ratio | Olefin conversion, percent by weight | Time required for 50% olefin conversion, hours | Selectivity, percent by weight | | | Normal ester percent by weight |
|---|---|---|---|---|---|---|
| | | | Ester | Acetal | Aldehyde | |
| 2:1 | 97.9 | 4.0 | 90.0 | 7.6 | 2.4 | 74.1 |
| 3:1 | 98.3 | 2.3 | 93.8 | 3.9 | 2.4 | 76.1 |
| 4:1 | 98.7 | 2.7 | 95.6 | 2.6 | 1.9 | 77.9 |
| 8:1 | 97.0 | 2.7 | 99.5 | 0.5 | 0.0 | 80.8 |
| 10:1 | 93.1 | 3.4 | 99.6 | 0.4 | 0.1 | 81.8 |
| 12:1 | 87.3 | 3.5 | 99.7 | 0.3 | 0.0 | 82.3 |

It is evident that wide ranges in the ligand-to-cobalt molar ratio can be employed within the scope of this process.

EXAMPLE IV

Four runs under the same conditions as used in Example I were carried out with 4-methylpyridine as ligand, the exception being that reaction zone temperature was varied and maintained in each run at the value shown in Table 4 concomitant with the results therefrom.

TABLE 4

| Temperature, ° C. | Olefin conversion, percent by weight | Time required for 50% olefin conversion, hours | Selectivity, percent by weight | | | Normal ester percent by weight |
|---|---|---|---|---|---|---|
| | | | Ester | Acetal | Aldehyde | |
| 140 | 93.8 | 3.2 | 99.1 | 0.6 | 0.2 | 80.1 |
| 150 | 98.8 | 2.7 | 98.3 | 0.9 | 0.3 | 80.1 |
| 170 | 97.4 | 2.0 | 95.6 | 2.3 | 0.7 | 78.4 |
| 180 | 91.3 | 2.2 | 93.1 | 2.6 | 1.4 | 76.8 |

After removal of unreacted methanol and dodecene by distillation, a portion of the methyl tridecanoate was flash distilled, and the ester obtained was then heated at 85–90° C. for about one hour with 20% aqueous potassium hydroxide (1.05 moles of KOH/mole of ester). Evolved methanol was removed by distillation at 90–95° C. The resulting light yellow solution was cooled and diluted with distilled water to give a 25% solution of potassium salts. The aqueous solution was then extracted several times with 150-ml. portions of methylene chloride to remove carbonyl impurities. The aqueous solution, after extraction, was covered with a layer of 100 ml. of diethyl ether and concentrated HCl was added until the pH of the lower layer was 2. The layers were separated, the aqueous layer was washed with 100 ml. of ether, the combined organic phases were washed with 50 ml. of distilled water, and the ether evaporated. Distillation of the remainder yielded high quality tridecanoic acid.

EXAMPLE V

The following runs summarized in Table 5 are typical of the lower alcohols and olefins that can be used in this process. The alcohol to olefin molar ratio used in Runs 2–5 was 4:1. In Runs 1 and 6, 1 mole of olefin was used for each 1.1 moles of hydroxyl group present. The ligand employed in Runs 2–5 was 3,5-dimethylpyridine and in Runs 1 and 6, 4-methylpyridine. In all runs the ligand-to-cobalt molar ratio was 6:1. The cobalt content of the catalyst complexes was maintained at a value of 1.0% by weight of cobalt based on the total reaction charges. The reactions were carried out at 160° C. and in the presence of sufficient carbon monoxide to maintain a pressure of 1000 p.s.i.g.

We claim as our invention:

1. A process of preparing lower alkyl esters of carboxylic acids having a high normal content by the reaction of a nonacetylenic olefinically unsaturated aliphatic hydrocarbon with carbon monoxide and lower aliphatic alcohol in the presence of, as catalyst, a complex of cobalt, carbon monoxide, and a nonortho lower alkyl-substituted pyridine selected from the group consisting of 3,5-dimethylpyridine, 4,4'-trimethylenedipyridine, and 4-ethyl-3,5-dimethylpyridine, at a temperature of from about 100° to about 200° C. and at a pressure of from about 200 to about 2000 p.s.i.g.

2. A process according to claim 1 wherein the nonortho lower alkyl-substituted pyridine is 3,5-dimethylpyridine.

3. A process according to claim 1 wherein the alkyl-pyridine-to-cobalt molar ratio is between 2:1 and 18:1

4. A process according to claim 3 wherein the nonacetylenic olefinically unsaturated aliphatic hydrocarbon is a straight-chain monoolefin and contains from 8 to 18 carbon atoms and the lower aliphatic alcohol contains from 1 to 4 carbon atoms.

TABLE 5

| Run | Alcohol | Olefin | Olefin conversion, percent by weight | Time[1] hours | Selectivity, percent by weight | | | Normal Ester | |
|---|---|---|---|---|---|---|---|---|---|
| | | | | | Ester | Acetal | Aldehyde | Percent by weight | Composition |
| 1 | Methanol | 1-dodecene | 96.2 | 1.6 | 97.3 | 0.0 | 1.8 | 80.5 | $CH_3(CH_2)_{11}CO_2CH_3$ |
| 2 | Ethanol | do | 99.1 | 1.9 | 96.7 | 1.6 | 0.9 | 80.0 | $CH_3(CH_2)_{11}CO_2CH_2CH_3$ |
| 3 | Isopropanol | do | 98.0 | 2.5 | 95.1 | 1.5 | 1.2 | 77.5 | $CH_3(CH_2)_{11}CO_2CH(CH_3)_2$ |
| 4 | n-Butanol | do | 100.0 | 2.9 | 95.5 | 1.0 | 1.1 | 80.2 | $CH_3(CH_2)_{11}CO_2(CH_2)_2CH_3$ |
| 5 | do | 1-Octene | 99.6 | 1.7 | 97.6 | 1.4 | 0.0 | 83.3 | $CH_3(CH_2)_7CO_2CH_2(CH_2)_3$ |
| 6 | 1,3-propanediol (trimethylene glycol) | do | 99.5 | 2.6 | 89.0 / 8.2 | | | 61.5 / 69.5 | $CH_3(CH_2)_7CO_2CH_2CH_2CH_2OCO(CH_2)_7CH_3$ / $CH_3(CH_2)_7CO_2CH_2CH_2CH_2OH$ |

[1] Time required for 50% olefin conversion.

EXAMPLE VI

A reaction zone previously purged with nitrogen was charged with a methanol/dodecene mixture in a molar ratio of 4:1, one run utilizing 1-dodecene and a like run utilizing internal dodecene. 3,5-dimethylpyridine ligand and cobalt octanoate in a molar ratio of 6:1 were added to give a cobalt concentration of 1.0% by weight of the total reaction charge. The reaction zone was charged with carbon monoxide and maintained at 160° C. and a pressure of 1000 p.s.i.g. CO for an ascertained period of time, after which the pressure was released and the product cooled and analyzed by gas-liquid chromatography (GLC). The results are summarized in Table 6.

5. A process according to claim 4 wherein the straight chain monoolefin contains from 10 to 16 carbon atoms and the alcohol is methanol.

6. A process according to claim 5 wherein the reaction is carried out at from about 120° to about 170° C. and at a pressure of from about 600 to about 1400 p.s.i.g.

7. A process according to claim 6 wherein the olefin is an α-olefin.

8. A process according to claim 6 wherein the olefin is an internal olefin.

TABLE 6

| Olefin | Olefin conversion, percent by weight | Time required for 50% olefin conversion, hours | Selectivity, percent by weight | | | Normal ester[1] percent by weight |
|---|---|---|---|---|---|---|
| | | | Ester | Acetal | Aldehyde | |
| 1-dodecene | 98.5 | 1.7 | 97.9 | 0.9 | 1.3 | 80.3 |
| Internal dodecene | 97.3 | 3.2 | 97.1 | 1.8 | 0.7 | 77.5 |

[1] 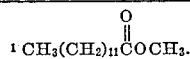

The results show that this process is equally applicable to internal as well as α-olefins.

After removal of unreacted methanol and dodecene by distillation, the methyl tridecanoate was flash distilled, and a portion of this ester was placed in a pressure vessel in the presence of a copper chromite catalyst and hydrogenated at a maximum hydrogen pressure of 2900 p.s.i.g. for about ten hours at 250° C. The resulting 1-tridecanol and methanol obtained were separated by distillation.

References Cited

Matsuda et al.: Bulletin of the Chem. Soc. Japan 38, pp. 710–715, May (1965).

LORRAINE A. WEINBERGER, Primary Examiner

R. S. WEISSBERG, Assistant Examiner

U.S. Cl. X.R.

260—497